US 12,158,595 B2

(12) United States Patent
Jung (10) Patent No.: US 12,158,595 B2
(45) Date of Patent: Dec. 3, 2024

(54) DUAL CAMERA MODULE COMPRISING LIQUID LENSES

(71) Applicant: LG INNOTEK CO., LTD., Seoul (KR)

(72) Inventor: Ji Young Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 924 days.

(21) Appl. No.: 17/052,898

(22) PCT Filed: May 3, 2019

(86) PCT No.: PCT/KR2019/005316
§ 371 (c)(1),
(2) Date: Nov. 4, 2020

(87) PCT Pub. No.: WO2019/212280
PCT Pub. Date: Nov. 7, 2019

(65) Prior Publication Data
US 2021/0239886 A1  Aug. 5, 2021

(30) Foreign Application Priority Data

May 4, 2018 (KR) .................. 10-2018-0052033

(51) Int. Cl.
*G02B 3/14* (2006.01)
*G02B 27/64* (2006.01)
*G03B 13/36* (2021.01)

(52) U.S. Cl.
CPC ............. *G02B 3/14* (2013.01); *G02B 27/646* (2013.01); *G03B 13/36* (2013.01)

(58) Field of Classification Search
CPC ......... G02B 3/14; G02B 13/0075; G02B 3/12
See application file for complete search history.

(56) References Cited

U.S. PATENT DOCUMENTS

| 10,768,345 B2* | 9/2020 | Moon .................. G02B 13/009 |
| 11,474,284 B2* | 10/2022 | Kaminski .......... G02B 13/0075 |
| 2006/0079728 A1 | 4/2006 | Kuiper et al. |
| 2009/0009881 A1 | 1/2009 | Helwegen et al. |
| 2011/0211262 A1 | 9/2011 | Craen et al. |
| 2013/0002973 A1* | 1/2013 | Chen ..................... G03B 35/08 349/15 |

FOREIGN PATENT DOCUMENTS

| CN | 1981516 A | 6/2007 |
| CN | 101371168 A | 2/2009 |

(Continued)

*Primary Examiner* — Christopher Stanford
(74) *Attorney, Agent, or Firm* — Birch, Stewart, Kolasch & Birch, LLP (57) ABSTRACT

The dual camera module according to an embodiment comprises: a first lens assembly comprising a first liquid lens; and a second lens assembly comprising a second liquid lens, the first and second liquid lenses each comprising a cavity, conductive and non-conductive liquids disposed in the cavity, first and second electrodes, and an insulating layer disposed as to cover at least a part of the first electrode along an inner surface defining the cavity, wherein the insulating layer of the first liquid lens and that of the second liquid lens may have different thicknesses.

9 Claims, 7 Drawing Sheets (56) References Cited

FOREIGN PATENT DOCUMENTS

| | | |
|---|---|---|
| CN | 102103220 A | 6/2011 |
| JP | 2001-13306 A | 1/2001 |
| KR | 10-2008-0084824 A | 9/2008 |
| KR | 10-2009-0109272 A | 10/2009 |
| KR | 10-1098313 B1 | 12/2011 |
| KR | 10-2018-0029664 A | 3/2018 |
| WO | WO-2006095274 A1 * | 9/2006 ........... G02B 26/005 |
| WO | WO 2018/052228 A1 | 3/2018 |

* cited by examiner

| VOLTAGE (V) | W.ANGLE Diopter | N.ANGLE Diopter | W. FOCAL LENGTH (mm) | N. FOCAL LENGTH (mm) |
|---|---|---|---|---|
| 30 | -17.93 | -23.95 | -55.77 | -41.76 |
| 31 | -16.30 | -22.72 | -61.36 | -44.01 |
| 32 | -14.61 | -21.46 | -68.43 | -46.60 |
| 33 | -12.87 | -20.16 | -77.67 | -49.61 |
| 34 | -11.08 | -18.81 | -90.23 | -53.16 |
| 35 | -9.24 | -17.43 | -108.26 | -57.38 |
| 36 | -7.34 | -16.00 | -136.27 | -62.49 |
| 37 | -5.39 | -14.54 | -185.66 | -68.78 |
| 38 | -3.38 | -13.04 | -295.84 | -76.72 |
| 39 | -1.32 | -11.49 | -757.10 | -87.03 |
| 40 | 0.79 | -9.91 | 1262.58 | -100.95 |
| 41 | 2.96 | -8.28 | 338.02 | -120.76 |
| 42 | 5.18 | -6.62 | 193.12 | -151.14 |
| 43 | 7.45 | -4.91 | 134.20 | -203.61 |
| 44 | 9.78 | -3.17 | 102.27 | -315.83 |
| 45 | 12.16 | -1.38 | 82.25 | -724.11 |
| 46 | 14.59 | 0.44 | 68.53 | 2250.49 |
| 47 | 17.08 | 2.31 | 58.55 | 432.94 |
| 48 | 19.62 | 4.22 | 50.97 | 237.23 |
| 49 | 22.21 | 6.16 | 45.02 | 162.31 |
| 50 | 24.86 | 8.15 | 40.22 | 122.75 |
| 51 | 27.56 | 10.17 | 36.28 | 98.30 |
| 52 | 30.32 | 12.24 | 32.98 | 81.71 |
| 53 | 33.13 | 14.35 | 30.19 | 69.71 |
| 54 | 35.99 | 16.49 | 27.79 | 60.64 |
| 55 | 38.90 | 18.68 | 25.70 | 53.54 |
| 56 | 41.87 | 20.90 | 23.88 | 47.84 |
| 57 | 44.89 | 23.17 | 22.27 | 43.16 |
| 58 | 47.97 | 25.48 | 20.85 | 39.25 |
| 59 | 51.10 | 27.82 | 19.57 | 35.94 |
| 60 | 54.28 | 30.21 | 18.42 | 33.10 |
| 61 | 57.52 | 32.64 | 17.39 | 30.64 |
| 62 | 60.81 | 35.11 | 16.45 | 28.49 |
| 63 | 64.15 | 37.61 | 15.59 | 26.59 |
| 64 | 67.55 | 40.16 | 14.80 | 24.90 |
| 65 | 71.00 | 42.75 | 14.08 | 23.39 |
| 66 | 74.50 | 45.38 | 13.42 | 22.04 |
| 67 | 78.06 | 48.04 | 12.81 | 20.81 |
| 68 | 81.67 | 50.75 | 12.24 | 19.70 |
| 69 | 85.33 | 53.50 | 11.72 | 18.69 |
| 70 | 89.05 | 56.29 | 11.23 | 17.77 |

DUAL CAMERA MODULE COMPRISING LIQUID LENSES

CROSS REFERENCE TO RELATED APPLICATIONS

This application is the National Phase of PCT/KR2019/005316 filed on May 3, 2019, which claims priority under 35 U.S.C. § 119 (a) to Patent Application No. 10-2018-0052033 filed in the Republic of Korea on May 4, 2018, all of which are hereby expressly incorporated by reference into the present application.

Technical Field

Embodiments relate to a dual camera module including a liquid lens.

Background Art

People who use portable devices demand optical devices that have high resolution, are small, and have various photographing functions. For example, the various photographing functions may include at least one of an optical zoom-in/zoom-out function, an auto-focusing (AF) function, or a hand-tremor compensation or optical image stabilizer (OIS) function.

Conventionally, in order to realize the aforementioned various photographing functions, a method of combining a plurality of lenses and directly moving the combined lenses is used. In the case in which the number of lenses is increased, however, the size of an optical device may be increased.

The auto-focusing function and the hand-tremor compensation function are performed by moving or tilting several lenses, which are fixed to a lens holder and are aligned with an optical axis, along the optical axis or in a direction perpendicular to the optical axis. To this end, a separate lens-moving apparatus is required to move a lens assembly composed of a plurality of lenses. However, the lens-moving apparatus consumes a lot of power, and a cover glass needs to be provided separately from a camera module in order to protect the lens-moving apparatus, thus leading to an increase in the overall size of the conventional camera module. In order to solve this problem, research has been conducted on a liquid lens configured to electrically adjust the curvature of an interface between two types of liquids in order to perform the auto-focusing function and the hand-tremor compensation function.

DISCLOSURE

Technical Problem

Embodiments provide a dual camera module that uses a liquid lens and is capable of implementing multiple focal points with a simple structure.

The objects to be accomplished by the disclosure are not limited to the above-mentioned objects, and other objects not mentioned herein will be clearly understood by those skilled in the art from the following description.

Technical Solution

A dual camera module according to an embodiment may include a first lens assembly including a first liquid lens and a second lens assembly including a second liquid lens. Each of the first liquid lens and the second liquid lens may include a cavity, conductive and non-conductive liquids disposed in the cavity, a first electrode, a second electrode, and an insulation layer disposed along an inner surface forming the cavity so as to cover at least a portion of the first electrode. The insulation layer of the first liquid lens and the insulation layer of the second liquid lens may be different thicknesses from each other.

For example, a control circuit configured to simultaneously apply the same driving voltage to the first lens assembly and the second lens assembly may be further included.

For example, when the insulation layer of the first liquid lens has a thickness smaller than the thickness of the insulation layer of the second liquid lens, the first liquid lens may have a focal length shorter than the focal length of the second liquid lens at the same driving voltage.

For example, the first lens assembly may operate as a wide-angle lens, and the second lens assembly may operate as a narrow-angle lens.

For example, the insulation layer of each of the first liquid lens and the second liquid lens may have a thickness of 1 μm to 6 μm.

Advantageous Effects

A dual camera module according to an embodiment is capable of implementing multiple focal points even when the same driving voltage is simultaneously applied to different lens assemblies.

Accordingly, since a switching element such as a multiplexer for time-division control is not necessary, the structure thereof is simplified, and miniaturization thereof is possible.

The effects achievable through the disclosure are not limited to the above-mentioned effects, and other effects not mentioned herein will be clearly understood by those skilled in the art from the following description.

BEST MODE

Hereinafter, exemplary embodiments will be described in detail with reference to the accompanying drawings. While the disclosure is susceptible to various modifications and alternative forms, specific embodiments thereof are shown by way of example in the drawings. However, the disclosure should not be construed as being limited to the embodiments set forth herein, but on the contrary, the disclosure is to cover all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be directly on or under the other element, or can be indirectly formed such that one or more intervening elements are also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element, without necessarily requiring or involving any physical or logical relationship or sequence between such subjects or elements.

Figure 1:
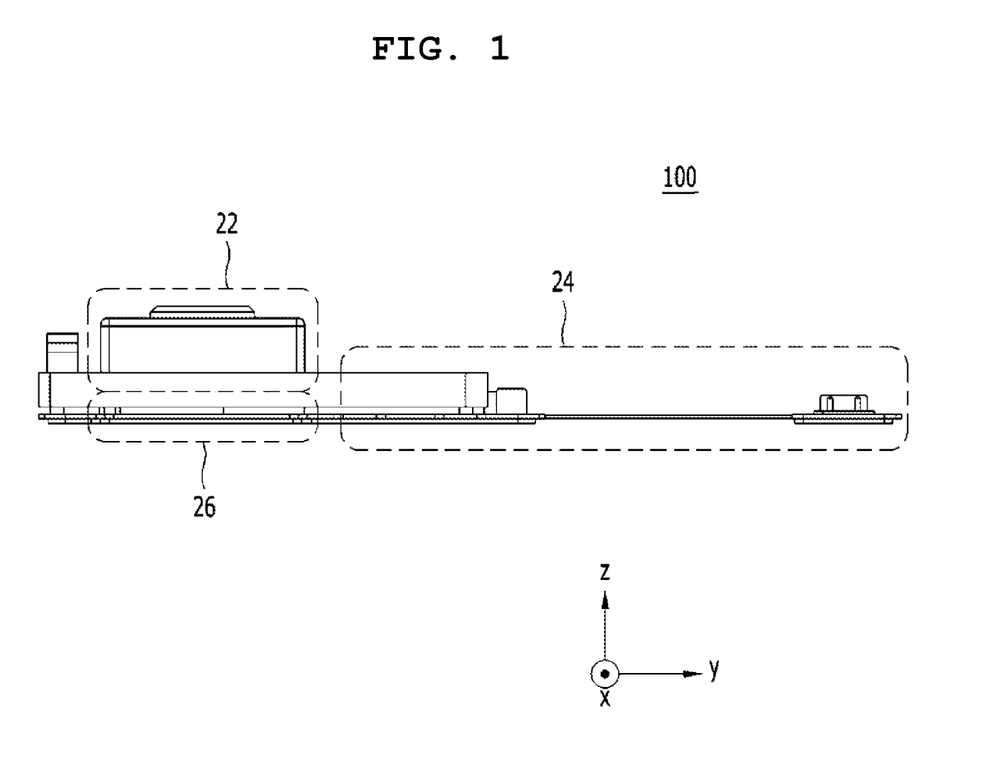
FIG. 1 illustrates a schematic side view of a camera module according to an embodiment.

FIG. 1 illustrates a schematic cross-sectional view of a camera module according to an embodiment.

Hereinafter, a liquid lens and a camera module including the liquid lens according to embodiments will be described the Cartesian coordinate system, but the embodiments are not limited thereto. That is, in the Cartesian coordinate system, the x-axis, the y-axis and the z-axis are perpendicular to one another, but the embodiments are not limited thereto. That is, the x-axis, the y-axis, and the z-axis may cross one another, rather than being perpendicular to one another.

Hereinafter, a camera module 100 according to an embodiment will be described with reference to FIGS. 1 to 3. However, the liquid lens according to the embodiment may also be applied to a camera module having a configuration different from that of the camera module 100 shown in FIGS. 1 to 3.

FIG. 1 illustrates a schematic side view of the camera module 100 according to an embodiment.

Referring to FIG. 1, the camera module 100 may include a lens assembly 22, a control circuit 24, and an image sensor 26.

First, the lens assembly 22 may include a lens unit and a holder in which the lens unit is accommodated. As will be described below, the lens unit may include a liquid lens unit, and may further include a first lens unit or a second lens unit. Alternatively, the lens unit may include all of the first and second lens units and the liquid lens unit.

The control circuit 24 serves to supply a driving voltage (or an operation voltage) to the liquid lens unit.

The control circuit 24 and the image sensor 26 described above may be disposed on a single printed circuit board (PCB), but this is merely given by way of example, and the embodiment is not limited thereto.

When the camera module 100 according to the embodiment is applied to an optical device (or an optical instrument), the configuration of the control circuit 24 may be designed in different ways depending on the specifications required in the optical device. In particular, the control circuit 24 may be implemented as a single chip so as to reduce the magnitude of the driving voltage applied to the lens assembly 22. Thereby, the size of an optical device mounted in a portable device may be further reduced.

Figure 2:
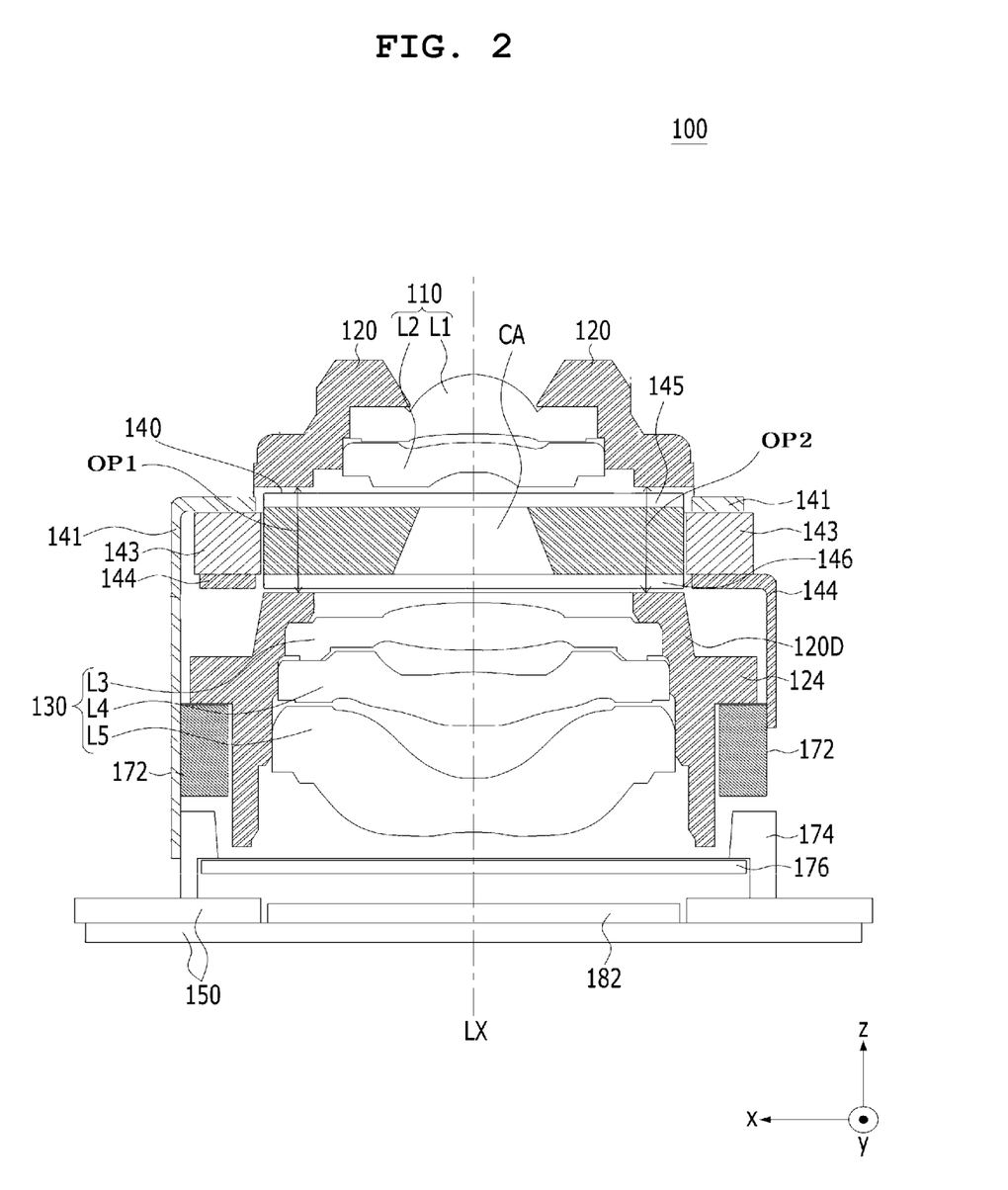
FIG. 2 illustrates a cross-sectional view of the camera module shown in FIG. 1.

FIG. 2 illustrates a cross-sectional view of an embodiment of the camera module 100 shown in FIG. 1.

Referring to FIG. 2, the camera module 100 may include a lens assembly, a main board 150, and an image sensor 182. In addition, the camera module 100 may further include a middle base 172. In addition, the camera module 100 may further include a sensor base 174 and a filter 176, or may not include the sensor base 174 and the filter 176, as shown in FIG. 2.

According to the embodiment, at least one of the components 110 to 176 of the camera module 100 shown in FIG. 2 may be omitted. Alternatively, at least one component different from the components 110 to 176 shown in FIG. 2 may be further included in the camera module 100.

Referring to FIG. 2, the lens assembly may include at least one of a liquid lens unit 140, a holder 120, a first lens unit 110, or a second lens unit 130, and may correspond to the lens assembly 22 shown in FIG. 1. The lens assembly may be disposed on the main board 150.

In the lens assembly, the first lens unit 110 and the second lens unit 130 may be referred to as a 'first solid lens unit' and a 'second solid lens unit', respectively, in order to be distinguished from the liquid lens unit 140.

The first lens unit 110 may be disposed at the upper side of the lens assembly, and may be a region on which light is incident from outside the lens assembly. That is, the first lens unit 110 may be disposed above the liquid lens unit 140 within the holder 120. The first lens unit 110 may be implemented using a single lens, or may be implemented using two or more lenses that are aligned along a center axis to form an optical system.

Here, the center axis may be an optical axis LX of the optical system, which is formed by the first lens unit 110, the liquid lens unit 140, and the second lens unit 130 included in the camera module 100, or may be an axis parallel to the optical axis LX. The optical axis LX may correspond to the optical axis of the image sensor 182. That is, the first lens unit 110, the liquid lens unit 140, the second lens unit 130, and the image sensor 182 may be aligned along the optical axis LX through active alignment (AA).

Here, active alignment may mean an operation of aligning the optical axes of the first lens unit 110, the second lens unit 130, and the liquid lens unit 140 with each other and an relationship or distance adjusting axial relationship between the image sensor 182 and the lens units 110, 130 and 140 in order to acquire an improved image.

In addition, as illustrated in FIG. 2, the first lens unit 110 may include, for example, two lenses L1 and L2, but this is merely given by way of example, and the first lens unit 110 may include one lens, or three or more lenses.

In addition, an exposure lens may be disposed at the upper side of the first lens unit 110. Here, the exposure lens may be the outermost lens among the lenses included in the first lens unit 110. That is, the lens L1 located at the uppermost side of the first lens unit 110 may protrude upwards, and therefore, may function as the exposure lens. The exposure lens faces the risk of damage to the surface thereof since it protrudes outwards from the holder 120. When the surface of the exposure lens is damaged, the quality of an image captured by the camera module 100 may be deteriorated. Therefore, in order to prevent or minimize damage to the surface of the exposure lens, a cover glass may be disposed, or a coating layer may be formed on the top of the exposure lens. Alternatively, in order to prevent damage to the surface of the exposure lens, the exposure lens may be formed of a wear-resistant material having higher rigidity than the lenses of the other lens units.

A first connection substrate 141 and a second connection substrate 144 are bent in the −z-axis direction. A spacer 143 may be disposed between the first connection substrate 141 and the second connection substrate 144, and may be disposed so as to protrude from at least one of a first or second opening OP1 or OP2 in the holder 120.

First and second holes may be formed respectively in the upper portion and the lower portion of the holder 120 to open the upper portion and the lower portion of the holder 120, respectively. The first lens unit 110 may be accommodated in, mounted in, seated in, in contact with, fixed to, provisionally fixed to, supported by, coupled to, or disposed in the first hole, which is formed in the holder 120, and the second lens unit 130 may be accommodated in, mounted in, seated in in, contact with, fixed to, provisionally fixed to, supported by, coupled to, or disposed in the second hole, which is formed in the holder 120.

In addition, the first and second sidewalls of the holder 120 may be disposed so as to face each other in a direction perpendicular to the direction of the optical axis LX (e.g. in the x-axis direction), and the third and fourth sidewalls may be disposed so as to face each other in a direction perpendicular to the direction of the optical axis LX (e.g. in the y-axis direction). In addition, the first sidewall of the holder 120 may include a first opening OP1, and the second sidewall thereof may include a second opening OP2 having a shape that is the same as or similar to that of the first opening OP1. Thus, the first opening OP1 disposed in the first sidewall and the second opening OP2 disposed in the second sidewall may be disposed so as to face each other in a direction perpendicular to the direction of the optical axis LX (e.g. in the x-axis direction).

The inner space in the holder 120, in which the liquid lens unit 140 is disposed, may be open due to the first and second openings OP1 and OP2. In this case, the liquid lens unit 140 may be inserted through the first or second opening OP1 or OP2 so as to be mounted in, seated in, in contact with, fixed to, provisionally fixed to, supported by, coupled to, or disposed in the inner space in the holder 120.

As such, in order to allow the liquid lens unit 140 to be inserted into the inner space in the holder 120 through the first or second opening OP1 or OP2, the size of the first or second opening OP1 or OP2 in the holder 120 in the direction of the optical axis LX may be greater than the cross-sectional area of the liquid lens unit 140 in the y-axis direction and the z-axis direction.

The second lens unit 130 may be disposed below the liquid lens unit 140 within the holder 120. The second lens unit 130 may be spaced apart from the first lens unit 110 in the optical-axis direction (e.g. in the z-axis direction).

The light introduced into the first lens unit 110 from outside the camera module 100 may pass through the liquid lens unit 140 and may be introduced into the second lens unit 130. The second lens unit 130 may be implemented using a single lens, or may be implemented using two or more lenses, which are aligned along the center axis to form an optical system. For example, as illustrated in FIG. 2, the second lens unit 130 may include three lenses L3, L4 and L5, but this is merely given by way of example, and two or less lenses or four or more lenses may be included in the second lens unit 130.

Unlike the liquid lens unit 140, each of the first lens unit 110 and the second lens unit 130 may be a solid lens formed of glass or plastic, but the embodiment is not limited as to a specific material of each of the first lens unit 110 and the second lens unit 130.

In addition, as shown in FIG. 2, the liquid lens unit 140 may include a first connection substrate 141, a liquid lens 142, a spacer 143, and a second connection substrate 144.

The first connection substrate 141 may electrically connect a plurality of individual electrodes (not shown) included in the liquid lens 142 to the main board 150, and may be disposed above the liquid lens 142. The first connection substrate 141 may be implemented as a flexible printed circuit board (FPCB).

In addition, the first connection substrate 141 may be electrically connected to an electrode pad (not shown), which is formed on the main board 150, via a connection pad (not shown), which is electrically connected to each of a plurality of individual electrodes. To this end, after the liquid lens unit 140 is inserted into the inner space of the holder 120, the first connection substrate 141 may be subjected to bending in the −z-axis direction toward the main board 150, and thereafter the connection pad (not shown) and the electrode pad (not shown) may be electrically connected to each other via conductive epoxy. In another embodiment, the first connection substrate 141 may be connected to a first holder surface electrode, which is conductive and is disposed, formed, or coated on the surface of the holder 120, so as to be electrically connected to the main board 150 via the first holder surface electrode, which is conductive and is disposed on the surface of the holder 120, but the embodiment is not limited thereto.

The second connection substrate 144 may electrically connect a common electrode included in the liquid lens 142 to the main board 150, and may be disposed below the liquid lens 142. The second connection substrate 144 may be implemented as an FPCB or a single metal substrate (a conductive metal plate). Here, the individual electrodes and the common electrode will be described later in detail with reference to FIGS. 3 and 4.

The second connection substrate 144 may be electrically connected to an electrode pad, which is formed on the main board 150, via a connection pad, which is electrically connected to the common electrode. To this end, after the liquid lens unit 140 is inserted into the inner space of the holder 120, the second connection substrate 144 may be subjected to bending in the −z-axis direction toward the main board 150. In another embodiment, the second connection substrate 144 may be connected to a second holder surface electrode, which is conductive and is disposed, formed, or coated on the surface of the holder 120, so as to be electrically connected to the main board 150 via the second holder surface electrode, which is conductive and is disposed on the surface of the holder 120, but the embodiment is not limited thereto.

The spacer 143 may be disposed so as to surround the liquid lens 142, and may protect the liquid lens 142 from external impacts. To this end, the spacer 143 may have a shape that allows the liquid lens 142 to be mounted in, seated in, in contact with, fixed to, provisionally fixed to, supported by, coupled to, or disposed in the spacer.

In addition, the spacer 143 may be disposed between the first connection substrate 141 and the second connection substrate 144, and may be disposed so as to protrude from at least one of the first or second opening OP1 or OP2 in the holder 120. That is, at least a portion of the spacer 143 may be shaped so as to protrude, along with the first and second connection substrates 141 and 144, from at least one of the first or second sidewall of the holder 120 in the direction perpendicular to the optical axis LX (e.g. in the x-axis direction). The reason for this is that the length of the spacer 143 in the x-axis direction may be greater than the length of the holder 120 in the x-axis direction.

In addition, a cover (not shown) may be disposed so as to surround the holder 120, the liquid lens unit 140, and the middle base 172, and may protect these components 120, 140 and 172 from external impacts. In particular, since the cover is disposed, a plurality of lenses, which forms an optical system, may be protected from external impacts.

Meanwhile, the middle base 172 may be disposed so as to surround the second hole in the holder 120. To this end, the middle base 172 may include an accommodating hole (not shown) for accommodating the second hole therein. The inner diameter of the middle base 172 (i.e. the diameter of the accommodating hole) may be equal to or greater than the outer diameter of the second hole. The accommodating hole may be formed near the center of the middle base 172 at a position corresponding to the position of the image sensor 182, which is disposed in the camera module 100. The middle base 172 may be mounted on the main board 150 so as to be spaced apart from a circuit element on the main board 150. That is, the holder 120 may be disposed on the main board 150 so as to be spaced apart from the circuit element.

The main board 150 may be disposed below the middle base 172, and may include a recess in which the image sensor 182 may be mounted, seated, tightly disposed, fixed, provisionally fixed, supported, coupled, or accommodated, the circuit element (not shown), a connection part (or an FPCB) (not shown), and a connector (not shown).

The circuit element of the main board 150 may constitute a control module, which controls the liquid lens unit 140 and the image sensor 182. The circuit element may include at least one of a passive element or an active element, and may have any of various areas and heights. The plurality of circuit elements may be disposed so as not to overlap the holder 120 in the direction parallel to the optical axis LX. The main board 150 may be implemented as a rigid flexible printed circuit board (RFPCB) including an FPCB. The FPCB may be subjected to bending depending on the requirement of the space in which the camera module 100 is mounted.

The image sensor 182 may perform function of converting the light that has passed through the first lens unit 110, the liquid lens unit 140, and the second lens unit 130 of the lens assembly 110, 120, 130 and 140 into image data. More specifically, the image sensor 182 may generate image data by converting light into analog signals via a pixel array including a plurality of pixels and synthesizing digital signals corresponding to the analog signals.

Figure 3:
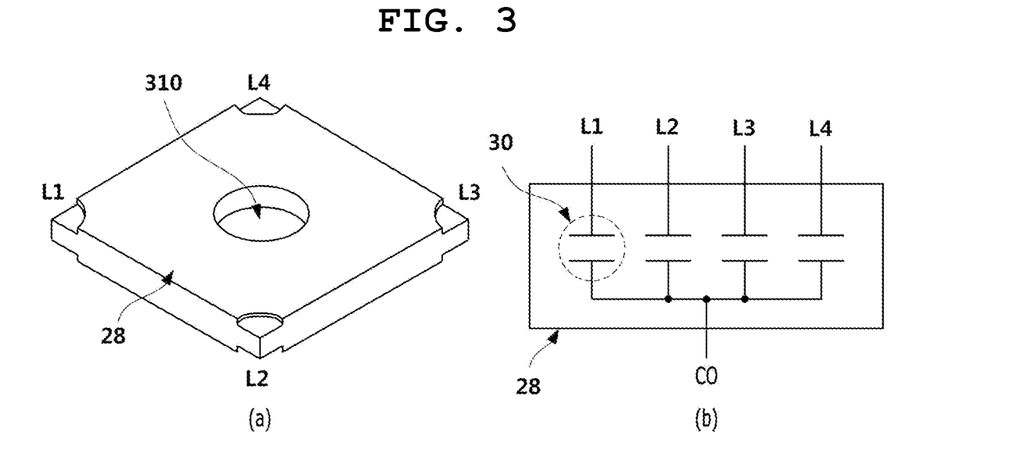
FIG. 3 illustrates a liquid lens, the focal length of which is adjusted in response to a driving voltage.

FIG. 3 illustrates a liquid lens, the focal length of which is adjusted in response to a driving voltage. Specifically, FIG. 3 (*a*) illustrates a liquid lens 28 included in the lens assembly 22, and FIG. 3 (*b*) illustrates an equivalent circuit of the liquid lens 28. Here, the liquid lens 28 may correspond to the liquid lens shown in FIG. 2.

Figure 4:
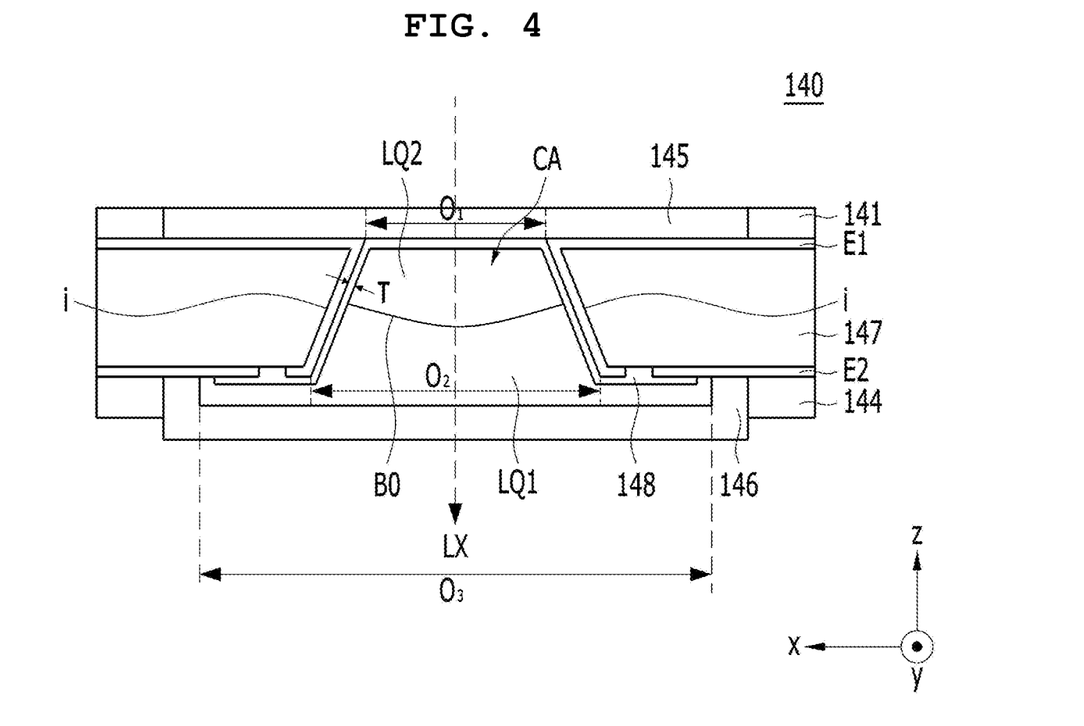
FIG. 4 illustrates a cross-sectional view of an embodiment of a liquid lens unit including the liquid lens according to the embodiment described above.

First, referring to FIG. 3 (*a*), the liquid lens 28, the focal length of which is adjusted in response to driving voltages, may receive driving voltages through sectors L1, L2, L3 and L4 of the individual electrodes (hereinafter referred to as 'individual electrode sectors'), which are disposed at the same angular interval from each other in four different directions. Here, the individual electrode sectors are parts of the individual electrodes, which are exposed without being covered by the second plate 145, as shown in FIG. 4, which will be described later. The individual electrode sectors L1, L2, L3 and L4 may be disposed at the same angular interval from each other with respect to the center axis of the liquid lens 28, and the number of individual electrode sectors may be four. The four individual electrode sectors may be disposed at the four corners of the liquid lens 28, respectively. When driving voltages (hereinafter referred to as 'individual voltages') are applied through the individual electrode sectors L1, L2, L3 and L4, the interface between the conductive liquid and the non-conductive liquid disposed in the lens region 310 may be deformed by the driving voltages, which are formed by the interaction between the applied individual voltages and the voltage applied to a common electrode sector CO (hereinafter referred to as 'common voltage'), which will be described later. Here, the common electrode sector is a part of the common electrode C, which is exposed without being covered by the third plate 146, as shown in FIG. 4, which will be described later.

In addition, referring to FIG. 3 (*b*), the liquid lens 28 may be constituted by a plurality of capacitors 30, one side of each of which receives an individual voltage from a corresponding one of the respectively different individual electrode sectors L1, L2, L3 and L4, and the other side of each of which is connected to the common electrode sector CO. Here, the plurality of capacitors 30 included in the equivalent circuit may have a low capacitance of about several tens to 200 picofarads (pF).

Hereinafter, the liquid lens unit 140 according to the embodiment will be described below with reference to FIG. 4. Here, the liquid lens unit 140 may be included in the camera module 100 shown in FIG. 2, but the embodiment is not limited thereto.

FIG. 4 illustrates a cross-sectional view of a liquid lens unit 28A according to an embodiment.

The liquid lens units 140 shown in FIG. 4 may include a first connection substrate 141, a liquid lens 142, a spacer 143, and a second connection substrate 144. The spacer 143 has been described above, and thus a duplicate description thereof will be omitted. For convenience of description, illustration of the spacer 143 is omitted from FIG. 4.

The liquid lens 142 may include a plurality of different types of liquids LQ1 and LQ2, first to third plates 147, 145 and 146, first and second electrodes E1 and E2, and an insulation layer 148.

The liquids LQ1 and LQ2 may be accommodated in the cavity CA, and may include a first liquid LQ1, which is conductive, and a second liquid (or an insulative liquid) LQ2, which is non-conductive. The first liquid LQ1 and the second liquid LQ2 may not mix with each other, and an interface BO may be formed on a contact portion between the first and second liquids LQ1 and LQ2. For example, the second liquid LQ2 may be disposed on the first liquid LQ1, but the embodiment is not limited thereto.

In addition, in the cross-sectional shape of the liquid lens 142, the edges of the first and second liquids LQ2 and LQ1 may be thinner than the center portions thereof.

The inner side surface of the first plate 147 may form a sidewall i of the cavity CA. The first plate 147 may include upper and lower openings having a predetermined inclined surface. That is, the cavity CA may be defined as an area that is surrounded by the inclined surface of the first plate 147, a third opening that is in contact with the second plate 145, and a fourth opening that is in contact with the third plate 146.

The diameter of a wider opening among the third and fourth openings may be changed depending on the field of view (FOV) required for the liquid lens 142 or the role of the liquid lens 142 in the camera module 100A. According to the embodiment, the size (the area or the width) of the fourth opening O2 may be greater than the size (the area or the width) of the third opening O1. Here, the size of each of the third and fourth openings may be the cross-sectional area in the horizontal direction (e.g. the x-axis direction and the y-axis direction). For example, the size of each of the third and fourth openings may mean the radius when the opening has a circular cross-section, and may mean the diagonal length when the opening has a square cross-section.

Each of the third and fourth openings may take the form of a hole having a circular cross-section, and the interface BO formed by the two liquids may be moved along the inclined surface of the cavity CA by a driving voltage.

The first liquid LQ1 and the second liquid LQ2 are charged, accommodated, or disposed in the cavity CA in the first plate 147. In addition, the cavity CA is the area through which the light that has passed through the first lens unit 110 or 110A passes. Thus, the first plate 147 may be formed of a transparent material, or may include impurities so that light does not easily pass therethrough.

The electrodes may be disposed respectively on one surface and the other surface of the first plate 147. A plurality of first electrodes E1 may be disposed on one surface (e.g. the upper surface, the side surface, and the lower surface) of the first plate 147 so as to be spaced apart from the second electrode E2. The second electrode E2 may be disposed on at least a portion of the other surface (e.g. the lower surface) of the first plate 147 and may be in direct contact with the first liquid LQ1.

In addition, the first electrodes E1 may be "n" electrodes (hereinafter, referred to as 'individual electrodes'), and the second electrode E2 may be a single electrode (hereinafter, referred to as a 'common electrode'). Here, "n" may be a positive integer of 2 or greater.

Each of the first and second electrodes E1 and E2 may include at least one electrode sector. For example, the first electrode E1 may include two or more electrode sectors, and the second electrode E2 may include at least one electrode sector. For example, the plurality of first electrodes E1 may include a plurality of electrode sectors sequentially disposed in the clockwise direction (or in the counterclockwise direction) about the optical axis. Here, the electrode sector means a portion of the electrode.

A portion of the second electrode E2 (i.e. an electrode sector of the second electrode E2) disposed on the other surface of the first plate 147 may be exposed to the first liquid LQ1, which is conductive.

Each of the first and second electrodes E1 and E2 may be formed of a conductive material.

In addition, the second plate 145 may be disposed on one surface of the first electrodes E1. That is, the second plate 145 may be disposed above the first plate 147. Specifically, the second plate 145 may be disposed above the upper surface of the first electrodes E1 and the cavity CA.

The third plate 146 may be disposed on one surface of the second electrode E2. That is, the third plate 146 may be disposed below the first plate 147. Specifically, the third plate 146 may be disposed below the lower surface of the second electrode E2 and the cavity CA.

The second plate 145 and the third plate 146 may be disposed so as to face each other, with the first plate 147 interposed therebetween. In addition, at least one of the second plate 145 or the third plate 146 may be omitted.

At least one of the second or third plate 145 or 146 may have a rectangular planar shape. The third plate 146 may be brought into contact with and bonded to the first plate 147 on a bonding area thereof around the edge.

Each of the second and third plates 145 and 146 may be an area through which light passes, and may be formed of a light-transmitting material. For example, each of the second and third plates 145 and 146 may be formed of glass, and for convenience of processing, may be formed of the same material. In addition, the edge of each of the second and third plates 145 and 146 may have a rectangular shape, without being necessarily limited thereto.

The second plate 145 may be configured to allow the light introduced from the first lens unit 110 or 110A to travel into the cavity CA in the first plate 145.

The third plate 146 may be configured to allow the light that has passed through the cavity CA in the first plate 145 to travel to the second lens unit 130 or 130A. The third plate 146 may be in direct contact with the first liquid LQ1.

According to the embodiment, the third plate 146 may have a diameter greater than the diameter of a wider opening among the third and fourth openings in the first plate 147. In addition, the third plate 146 may include a peripheral area spaced apart from the first plate 147.

In addition, the actual effective lens area of the liquid lens 142 may be narrower than the diameter (e.g. O2) of a wider opening among the third and fourth openings in the first plate 147. For example, when a region within a small radius about the center of the liquid lens 142 is used as an actual light transmission path, the diameter (e.g. O3) of the center area of the third plate 146 may be smaller than the diameter (e.g. O2) of a wider opening among the third and fourth openings in the first plate 147.

The insulation layer 148 may be disposed so as to cover a portion of the lower surface of the second plate 145 in the upper area of the cavity CA. That is, the insulation layer 148 may be disposed between the second liquid LQ2 and the second plate 145.

In addition, the insulation layer 148 may be disposed so as to cover a portion of the first electrode E1, which forms the sidewall of the cavity CA. In addition, the insulation layer 148 may be disposed on the lower surface of the first plate 147 so as to cover a portion of the first electrode E1, the first plate 147, and the second electrode E2. Thus, contact between the first electrode E1 and the first liquid LQ1 and contact between the first electrode E1 and the second liquid LQ2 may be prevented by the insulation layer 148.

The insulation layer 148 may cover one electrode among the first and second electrodes E1 and E2 (e.g. the first electrode E1), and may expose a portion of the other electrode (e.g. the second electrode E2) so that electrical energy is applied to the first liquid LQ1, which is conductive.

In the case of the camera module 100 according to the embodiment, the filter 176 for the blocking of ultraviolet light or infrared light is disposed between the middle base 172 and the image sensor 182, and filters light within a specific wavelength range, among the light that has passed through the first lens unit 110, the liquid lens 142, and the second lens unit 130. In addition, such an infrared light blocking filter or an ultraviolet light blocking filter is mounted in an inner recess in the sensor base 178.

At least one substrate, for example, the first connection substrate 141 and the second connection substrate 144, serves to supply a voltage to the liquid lens 142. To this end, the plurality of first electrodes E1 may be electrically connected to the first connection substrate 141, and the second electrode E2 may be electrically connected to the second connection substrate 144.

When a driving voltage is applied to the first and second electrodes E1 and E2 through the first connection substrate 141 and the second connection substrate 144, the interface BO between the first liquid LQ1 and the second liquid LQ2 may be deformed, and thus at least one of the shape, such as a curvature, or the focal length of the liquid lens 142 may be changed (or adjusted). For example, the focal length of the liquid lens 142 may be adjusted as at least one of the flexure or the inclination of the interface BO formed in the liquid lens 142 is changed according to the driving voltage. When the deformation or the radius of curvature of the interface BO is controlled, the liquid lens 142, the lens assembly 110, 120, 130 and 140 including the liquid lens 142, the camera module 100, and the optical device may perform an auto-focusing (AF) function and a hand-tremor compensation or optical image stabilizer (OIS) function.

The first connection substrate 141 may transmit four different driving voltages (hereinafter, referred to as 'individual voltages') to the liquid lens 142, and the second connection substrate 144 may transmit one driving voltage (hereinafter, referred to as a 'common voltage') to the liquid lens 142. The common voltage may include a DC voltage or an AC voltage. When the common voltage is applied in a pulse form, the pulse width or the duty cycle may be constant. The individual voltages supplied via the first connection substrate 141 may be applied to the plurality of first electrodes E1 (or the plurality of electrode sectors) exposed at the respective corners of the liquid lens 142.

Although not illustrated, when conductive epoxy is disposed between the first connection substrate 141 and the plurality of first electrodes E1, the first connection substrate 141 and the plurality of first electrodes E1 may be in contact with each other, may be coupled to each other, and may be in electrical conduction with each other. In addition, when conductive epoxy is disposed between the second connection substrate 144 and the second electrode E2, the second connection substrate 144 and the second electrode E2 may be in contact with each other, may be coupled to each other, and may be in electrical conduction with each other.

In addition, the first connection substrate 141 and the plurality of first electrodes E1 may be implemented as separate elements, or may be integrally formed. In addition, the second connection substrate 144 and the second electrode E2 may be implemented as separate elements, or may be integrally formed.

Meanwhile, a dual-camera function, which synthesizes images of an object respectively captured at a normal angle (or a narrow angle) and a wide angle into one image, has recently received increased attention. Such a dual camera may be implemented using a lens assembly including a liquid lens. For example, a dual camera according to an embodiment may be configured such that two image sensors 182 and lens assemblies, corresponding to the respective image sensors 182, are provided on one main board 150.

Figure 5:
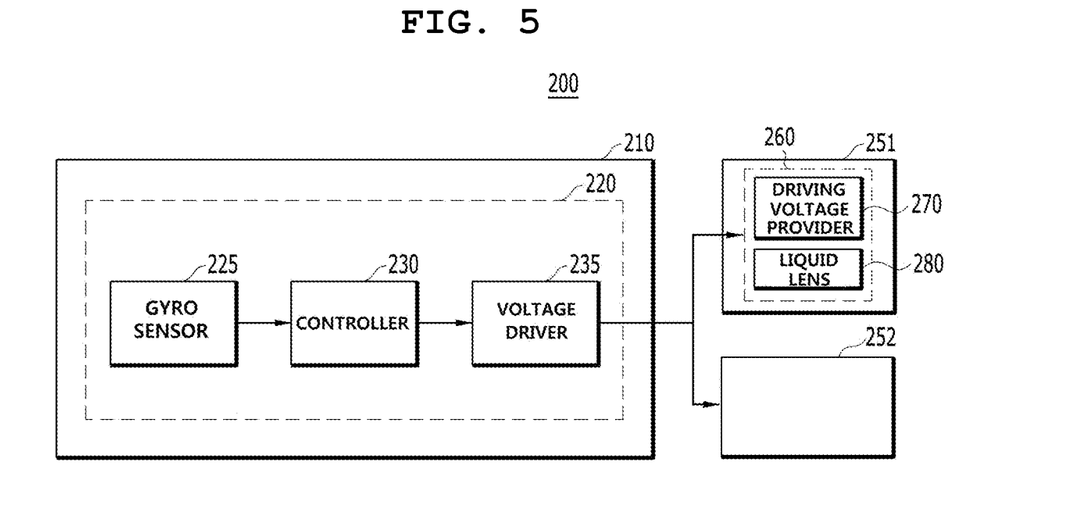
FIG. 5 is a schematic block diagram of a dual camera module according to an embodiment.

The configuration of the dual camera module will be described with reference to FIG. 5. FIG. 5 is a schematic block diagram of the dual camera module 200 according to an embodiment.

Referring to FIG. 5, the dual camera module 200 may include a control circuit 210 and two lens assemblies, i.e. a first lens assembly 251 and a second lens assembly 252. The control circuit 210 may correspond to the control circuit 24 shown in FIG. 1, and each of the first and second lens assemblies 251 and 252 may correspond to the lens assembly 22 shown in FIG. 1 or the lens assembly 110, 120, 130 and 140 shown in FIG. 2. The first lens assembly 251 may include a liquid lens module 260, and the liquid lens module 260 may include a driving voltage provider 270 and a liquid lens 280. Although not shown, the second lens assembly 252 may also include a liquid lens module 260, like the first lens assembly 251, and the liquid lens module 260 may include a driving voltage provider 270 and a liquid lens 280.

The control circuit 210 may include a control unit 220, and may control the operation of the liquid lens unit 140 including a liquid lens 280.

The control unit 220 may have a configuration for performing an AF function and an OIS function, and may control the liquid lens 280 included in each of the first lens assembly 251 and the second lens assembly using a user request or a sensed result (e.g. a motion signal of a gyro sensor 225). Here, the liquid lens 280 may correspond to the above-described liquid lens 142.

The control unit 220 may include a gyro sensor 225, a controller 230, and a voltage driver 235. The gyro sensor 225 may be an independent component that is not included in the control unit 220, or may be included in the control unit 220.

The gyro sensor 225 may sense the angular velocity of movement in two directions, including a yaw-axis direction and a pitch-axis direction, in order to compensate for hand tremor in the vertical and horizontal directions of the optical device. The gyro sensor 225 may generate a motion signal corresponding to the sensed angular velocity, and may provide the motion signal to the controller 230.

The controller 230 may remove a high frequency noise component from the motion signal using a low pass filter (LPF) so as to extract only a desired frequency band for implementation of an OIS function, may calculate the amount of hand tremor using the motion signal from which the noise has been removed, and may calculate a driving voltage corresponding to the shape that the liquid lens 280 of the liquid lens module 260 needs to have in order to compensate for the calculated amount of hand tremor.

The controller 230 may receive information for an AF function (i.e. information on the distance to an object) from an internal component (e.g. an image sensor 182) or an external component (e.g. a distance sensor or an application processor) of the optical device or the camera module 200, and may calculate a driving voltage corresponding to the desired shape of the liquid lens 280 based on a focal length, which is required to focus on the object, using the distance information.

The controller 230 may store a driving voltage table in which a driving voltage and a driving voltage code for making the voltage driver 235 generate the driving voltage are mapped, may acquire a driving voltage code corresponding to the calculated driving voltage by referring to the driving voltage table, and may output the acquired driving voltage code to the voltage driver 235.

The voltage driver 235 may generate, based on a driving voltage code in a digital form provided from the controller 230, a driving voltage in an analog form corresponding to the driving voltage code, and may provide the driving voltage to each of the first lens assembly 251 and the second lens assembly 252. At this time, the voltage driver 235 may provide the same driving voltage to the first lens assembly 251 and the second lens assembly 252.

The voltage driver 235 may include a voltage booster, which increases a voltage level upon receiving a supply voltage (e.g. a voltage supplied from a separate power supply circuit), a voltage stabilizer for stabilizing the output of the voltage booster, and a switching unit for selectively supplying the output of the voltage booster to each terminal of the liquid lens 280.

Here, the switching unit may include a circuit component called an H bridge. A high voltage output from the voltage booster is applied as a power supply voltage of the switching unit. The switching unit may selectively supply the applied power supply voltage and a ground voltage to opposite ends of the liquid lens 280. Here, as described above, the liquid lens 280 may include the four first electrodes E1 including four electrode sectors, the first connection substrate 141, the second electrode E2, and the second connection substrate 144 for driving. Opposite ends of the liquid lens 280 may mean any one of the plurality of first electrodes E1 and the second electrode E2. In addition, opposite ends of the liquid lens 280 may mean any one of the four electrode sectors of the four first electrodes E1 and one electrode sector of the second electrode E2.

A pulse-type voltage having a predetermined width may be applied to each electrode sector of the liquid lens 280, and the driving voltage applied to the liquid lens 280 is the difference between the voltages applied to each of the first electrodes E1 and the second electrode E2.

In addition, in order to allow the voltage driver 235 to control the driving voltage applied to the liquid lens 280 depending on a driving voltage code in a digital form provided from the controller 230, the voltage booster may control an increase in a voltage level, and the switching unit may control the phase of a pulse voltage applied to the common electrode and the individual electrodes so as to generate a driving voltage in an analog form, which corresponds to the driving voltage code.

That is, the control unit 220 may control the voltage applied to each of the first electrodes E1 and the second electrode E2.

The control circuit 210 may further include a connector (not shown), which performs a communication or interface function of the control circuit 210. For example, the connector may perform communication protocol conversion for communication between the control circuit 210, which uses an inter-integrated circuit (I2C) communication method, and the first and second lens assemblies 251 and 252, which use a mobile industry processor interface (MIPI) communication method. In addition, the connector may receive power from an external source (e.g. a battery), and may supply power required for the operation of the control unit 220 and the first and second lens assemblies 251 and 252. In this case, the connector may correspond to the connector 153 shown in FIG. 2.

The driving voltage provider 270 may receive a driving voltage from the voltage driver 235, and may provide the driving voltage to the liquid lens 280. Here, the driving voltage may be an analog voltage applied between any one of the "n" individual electrodes and one common electrode.

The driving voltage provider 270 may include a voltage adjustment circuit (not shown) or a noise removal circuit (not shown) for compensating for loss due to terminal connection between the control circuit 210 and the first and second lens assemblies 251 and 252, or may divert the voltage provided from the voltage driver 235 to the liquid lens 280.

The driving voltage provider 270 may be disposed on an FPCB (or a substrate), which constitutes at least a portion of the connection part 152, but the embodiment is not limited thereto. The connection part 152 may include the driving voltage provider 270.

The liquid lens 280 may be deformed in the interface BO thereof between the first liquid LQ1 and the second liquid LQ2 depending on a driving voltage, thereby performing at least one of an AF function or an OIS function.

Meanwhile, in the dual camera module 200 according to the embodiment, the first lens assembly 251 and the second lens assembly 252 may be configured to have different fields of view, i.e. multiple focal points. For example, one of the first lens assembly 251 and the second lens assembly 252 may operate as a narrow-angle lens, and the other one thereof may operate as a wide-angle lens.

In order to have different fields of view, when the same driving voltage is applied from the voltage driver 235, the interfaces of the liquid lens units of the first lens assembly 251 and the second lens assembly 252 are preferably changed so as to have different diopters.

To this end, the liquid lenses 280 of the first lens assembly 251 and the second lens assembly 252 may have different configurations. One example of the different configurations is the thickness T of the insulation layer 148 in the liquid lens unit 140 shown in FIG. 4.

Specifically, the diopter D of the liquid lens unit 140 is determined using Equation 1 below.

$$\mathcal{D} = \mathcal{D}_0 + \frac{\epsilon(n_i - n_c)}{2\gamma_{ci} d_f R} V^2 \qquad \text{[Equation 1]}$$

In Equation 1, $D_o$ represents the diopter when the liquid lens unit 140 is in an off state, i.e. in the state in which the driving voltage is not applied, $\epsilon$ represents the dielectric constant of the insulation layer 148, $d_f$ represents the thickness T of the insulation layer 148, and V represents the driving voltage that is applied. In addition, $Y_{ci}$ represents the liquid/liquid interfacial tension between the first liquid LQ1 and the second liquid LQ2, R represents the radius of the third opening, $n_i$ represents the refractive index of the second liquid LQ2, and $n_c$ represents the refractive index of the first liquid LQ1.

In conclusion, it can be seen from Equation 1 that the diopter when the driving voltage is applied is inversely proportional to the thickness df (i.e. T in FIG. 4) of the insulation layer 148 under the condition in which the other elements are fixed. In particular, the thickness of the insulation layer 148 is a factor that is capable of being controlled during the process of depositing the insulation layer 148, and is thus capable of being changed relatively easily compared to other elements, which is advantageous from the aspect of production efficiency when it is intended to change the diopter characteristics of the liquid lens unit 140.

Further, the sizes of the cavity in the first liquid lens and the cavity in the second liquid lens may be the same as or different from each other. For example, the size of the cavity in the liquid lens implementing a wide angle may be larger than the size of the liquid lens implementing a narrow angle.

Figure 6:
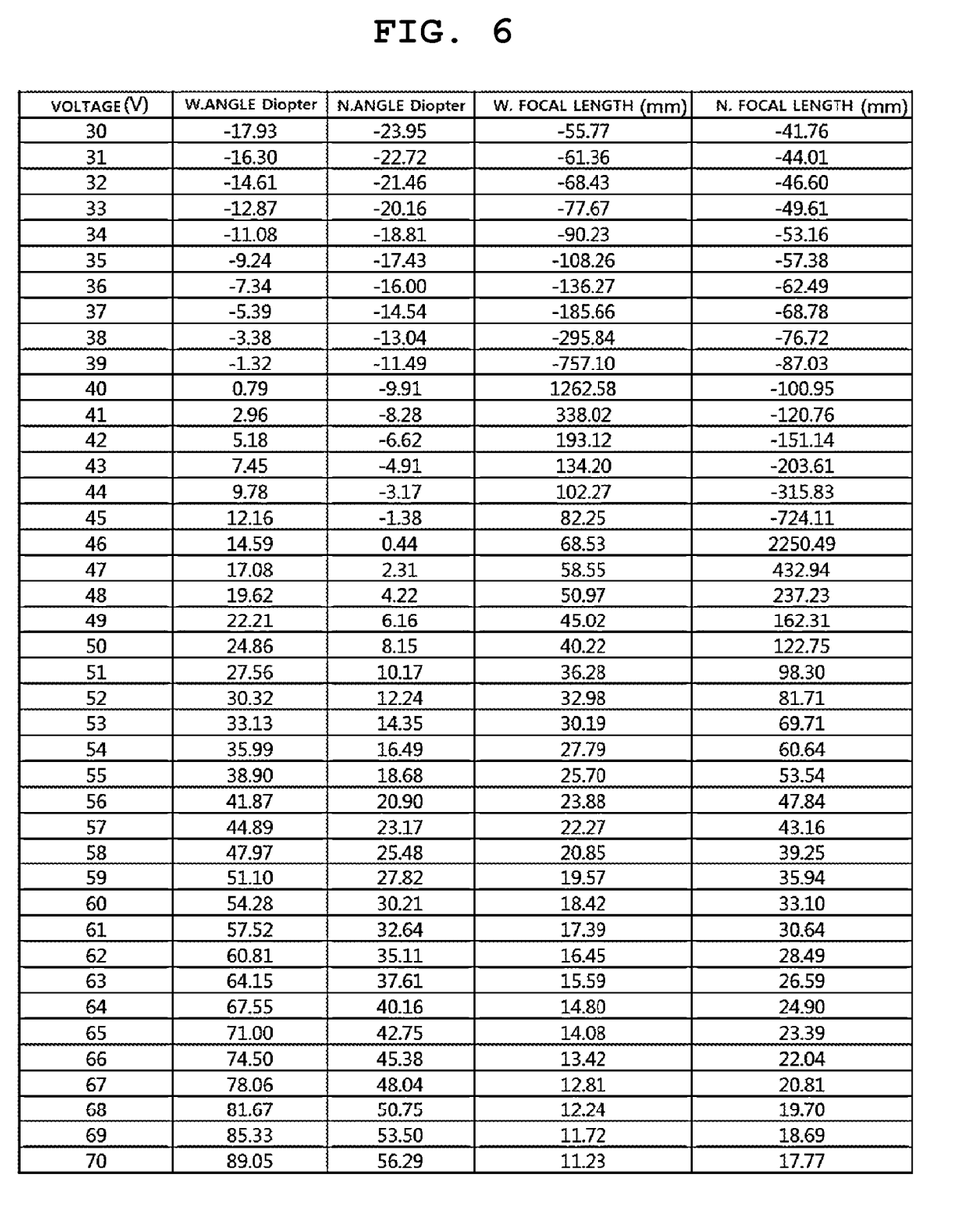
FIG. 6 is a table indicating diopters and focal lengths for each driving voltage depending on the thicknesses of insulation layers of the liquid lens units according to the embodiment.
Figure 7:
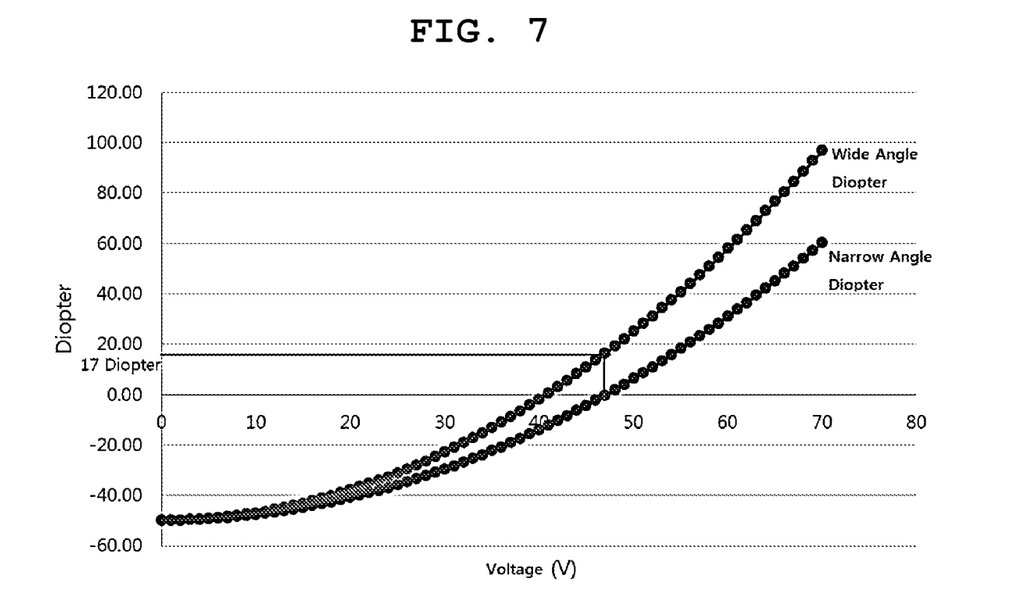
FIG. 7 is a graph indicating diopters for each driving voltage depending on the thicknesses of the insulation layers of the liquid lens units according to the embodiment.

The diopters and the focal lengths for each driving voltage of one embodiment depending on the difference in the thickness of the insulation layer are indicated in the table shown in FIG. 6 and the graph shown in FIG. 7.

FIG. 6 is a table indicating the diopters and the focal lengths for each driving voltage depending on the thicknesses of the insulation layers of the liquid lens units according to the embodiment, and FIG. 7 is a graph indicating the diopters for each driving voltage depending on the thicknesses of the insulation layers of the liquid lens units according to the embodiment.

Referring to FIGS. 6 and 7, the liquid lens unit 140 of the first lens assembly 251 exhibits a relatively high diopter when the same driving voltage is applied thereto, thereby exhibiting the characteristics of a wide-angle lens that has a short focal length. On the other hand, the liquid lens unit 140 of the second lens assembly 252 exhibits a relatively low diopter when the same driving voltage is applied thereto, thereby exhibiting the characteristics of a narrow-angle lens that has a long focal length. Accordingly, it can be seen that, even when the same driving voltage is applied thereto, the two lens assemblies 251 and 252 have different focal lengths and thus implement multiple focal points due to the difference in the thickness of the insulation layer 148 therebetween.

In particular, as shown in FIG. 7, at the point at which the diopter of the second lens assembly 252 (i.e. the narrow-angle diopter) is 0 (i.e. when the driving voltage is about 47 V), the diopter of the first lens assembly 251 (i.e. the wide-angle diopter) is about 17. Therefore, when the remaining components of the lens assemblies, e.g. the first lens unit 110 and the second lens unit 130, are designed on the basis of the narrow-angle characteristics, the above diopter difference may be considered. Specifically, in the case in which the first lens unit 110 and the second lens unit 130 of the second lens assembly 252 are designed first, and thereafter the first lens unit 110 and the second lens unit 130 of the first lens assembly 251 are designed based thereon, at least one of the first lens unit 110 and the second lens unit 130 of the first lens assembly 251 may have a structure suitable for compensating for the 17-diopter difference. In this case, the first lens assembly 251 and the second lens assembly 252 may have the same AF characteristics with respect to the distance to an object corresponding to a specific voltage band (e.g. coincidence of focal points upon application of the same driving voltage).

Meanwhile, macro performance may be considered when determining the thickness of the insulation layer 148. The macro performance is related to the maximum diopter, which is influenced by the thickness of the insulation layer 148. This will be described with reference to FIG. 8.

Figure 8:
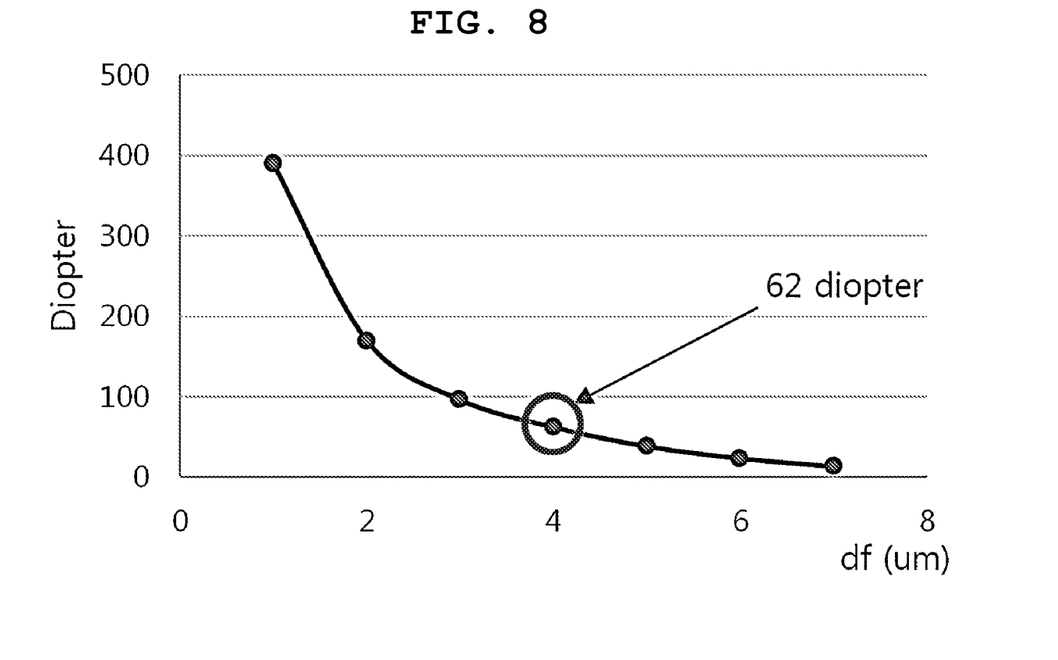
FIG. 8 is a graph indicating an example of the relationship between the maximum diopter and the thickness of the insulation layer.

FIG. 8 is a graph indicating an example of the relationship between the maximum diopter and the thickness of the insulation layer.

Referring to FIG. 8, it can be seen that the maximum diopter is inversely proportional to the thickness of the insulation layer 148. The thickness of the insulation layer 148 according to the embodiment may range from 1 μm to 6 μm. The reason for this is that, if the thickness of the insulation layer is less than 1 μm, it is difficult to uniformly deposit the insulation layer on the inclined surface that forms the sidewall i of the cavity CA, and if the thickness of the insulation layer exceeds 6 μm, it is difficult to secure the maximum diopter value. In other words, if the thickness of the insulation layer 148 is 4 μm, the maximum diopter is about 62, thereby satisfying a close-up photographing distance of 3 cm, whereas if the thickness of the insulation layer 148 is 6 μm, the maximum diopter is about 18, thereby making it difficult to realize a close-up photographing distance of 10 cm or less.

Figure 9:
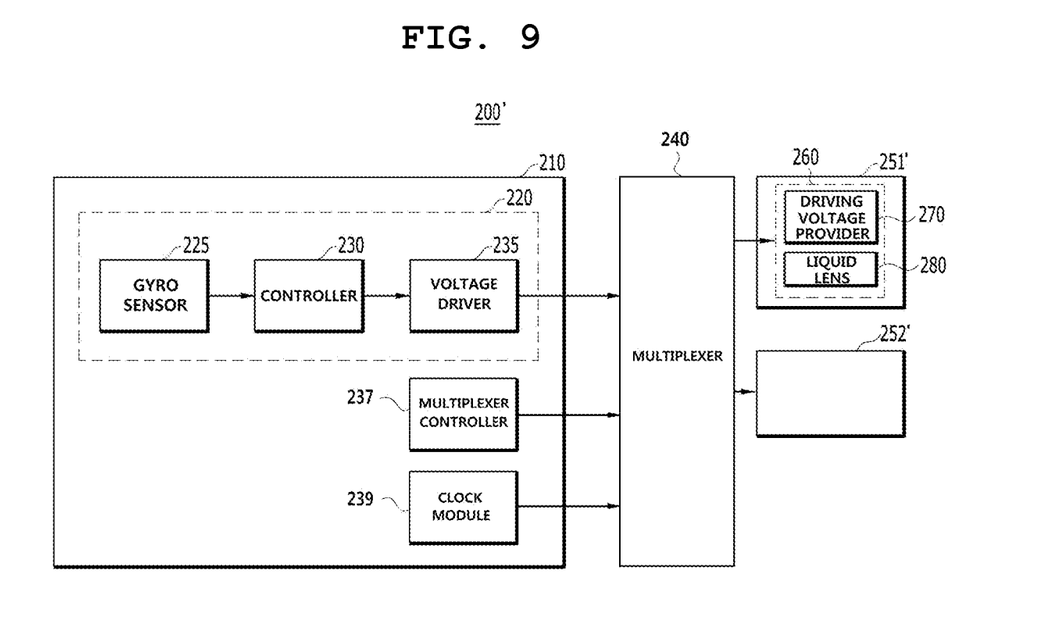
FIG. 9 illustrates an example of the structure of a dual camera module according to a comparative example.

The advantages of the dual camera module 200 described above will be described below with reference to FIG. 9, in which a comparative example is illustrated. FIG. 9 illustrates an example of the structure of a dual camera module 200' according to a comparative example.

Referring to FIG. 9, the dual camera module 200' according to the comparative example further includes a multiplexer controller 237, a clock module 239, and a multiplexer 240, compared to the dual camera module 200 according to the embodiment shown in FIG. 5. In addition, it is assumed that first and second lens assemblies 251' and 252' in the dual camera module 200' according to the comparative example have the same configuration. Hereinafter, a duplicate description of the same components as those in FIG. 5 will be omitted, and the differences therebetween will be mainly described.

The multiplexer controller 237 transmits, to the multiplexer 240, a command for short-circuiting both switches included in the multiplexer 240, or transmits, to the multiplexer 240, a command for opening one of the two switches included in the multiplexer 240 and short-circuiting the other switch.

The clock module 239 generates a clock signal to synchronize the control circuit 210 and the two lens assemblies 251 and 252.

The multiplexer 240 includes switches, the number of which corresponds to at least the number of lens assemblies, and transmits the driving voltage supplied from the voltage driver 235 to at least one of the two lens assemblies 251 and 252 depending on the state of the switch corresponding to the control of the multiplexer controller 237.

In conclusion, the dual camera module 200' according to the comparative example is not capable of simultaneously applying the same driving voltage to the first lens assembly 251' and the second lens assembly 252' in order to control the first lens assembly 251' and the second lens assembly 252' to have different focal lengths from each other (i.e. implement multiple focal points). Instead, the dual camera module 200' according to the comparative example needs to apply different driving voltages to the first lens assembly 251' and the second lens assembly 252', respectively, through the multiplexer 240 at different time points from each other in a time-division manner. Therefore, since the dual camera module 200' according to the comparative example needs to further include at least the multiplexer controller 237, the clock module 239, and the multiplexer 240, the structure thereof is complicated and the size of the main board 150 increases.

In contrast, in the dual camera module 200 according to the embodiment, even when the same driving voltage is simultaneously applied to the first lens assembly 251 and the second lens assembly 252, liquid lens units have different diopters from each other due to the different thicknesses of the insulation layers, thereby implementing multiple focal points. Furthermore, since the multiplexer controller 237, the clock module 239, and the multiplexer 240 are not necessary, there are advantages in that the structure thereof is simplified and miniaturization thereof is possible.

Although only a limited number of embodiments have been described above, various other embodiments are possible. The technical contents of the above-described embodiments may be combined into various forms as long as they are not incompatible with one another, and thus may be implemented in new embodiments.

Although only a limited number of embodiments have been described above, various other embodiments are possible. The technical contents of the above-described embodiments may be combined into various forms as long as they are not incompatible with one another, and thus may be implemented in new embodiments.

Meanwhile, an optical device may be implemented using the camera module 100A or 100B including the lens assembly according to the embodiment described above. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include a lens assembly.

In addition, the optical device may be implemented in a portable device such as, for example, a smartphone, a laptop computer, or a tablet computer. Such an optical device may include the camera module 100, a display unit (not shown) configured to output an image, a battery (not shown) configured to supply power to the camera module 100, and a body housing in which the camera module 100, the display unit, and the battery are mounted. The optical device may further include a communication module, which may communicate with other devices, and a memory unit, which may store data. The communication module and the memory unit may also be mounted in the body housing.

It will be apparent to those skilled in the art that various changes in form and details may be made without departing from the spirit and essential characteristics of the disclosure set forth herein. Accordingly, the above detailed description is not intended to be construed to limit the disclosure in all aspects and to be considered by way of example. The scope of the disclosure should be determined by reasonable interpretation of the appended claims and all equivalent modifications made without departing from the disclosure should be included in the following claims.

The invention claimed is:

1. A dual camera module, comprising:
   a first lens assembly comprising a first liquid lens; and
   a second lens assembly comprising a second liquid lens,
   wherein each of the first liquid lens and the second liquid lens comprises:
      a cavity;
      a conductive liquid and a non-conductive liquid disposed in the cavity;
      a first electrode;
      a second electrode; and
      an insulation layer disposed along an inner surface forming the cavity so as to cover at least a portion of the first electrode,
   wherein the insulation layer of the first liquid lens and the insulation layer of the second liquid lens have thicknesses different from each other,
   wherein a diopter difference between the first liquid lens and the second liquid lens is based at least in part on a difference in thickness of the insulation layer of the first liquid lens and the insulation layer of the second liquid lens,
   wherein the first lens assembly further comprises at least a first lens unit and a second lens unit, and
   wherein a diopter of the second lens assembly is 0 for a driving voltage applied to the second lens assembly, and
   wherein the first lens assembly and the second lens assembly are configured such that, when the driving voltage is applied to the first lens assembly and the second lens assembly, the diopter difference between the first liquid lens and the second liquid lens is 0.

2. The dual camera module according to claim 1, wherein the first lens assembly and the second lens assembly have different focal lengths different from each other, when the same driving voltage is applied thereto.

3. The dual camera module according to claim 1, wherein the insulation layer of the first liquid lens has a thickness smaller than a thickness of the insulation layer of the second liquid lens, and
   wherein the first liquid lens has a focal length shorter than a focal length of the second liquid lens at the same driving voltage.

4. The dual camera module according to claim 3, wherein the first lens assembly operates as a wide-angle lens, and
   wherein the second lens assembly operates as a narrow-angle lens.

5. The dual camera module according to claim 1, wherein the insulation layer of each of the first liquid lens and the second liquid lens has a thickness of 1 μm to 6 μm.

6. The dual camera module according to claim 1, wherein the insulation layer of each of the first liquid lens and the second liquid lens has a thickness of 4 μm or less.

7. The dual camera module according to claim 1, wherein the first lens assembly and the second lens assembly are disposed on a same board.

8. The dual camera module according to claim 1, wherein the cavity in the first liquid lens and the cavity in the second liquid lens have a same size as each other.

9. The dual camera module according to claim 1, wherein the cavity in the first liquid lens and the cavity in the second liquid lens have sizes different from each other.

* * * * *